UNITED STATES PATENT OFFICE.

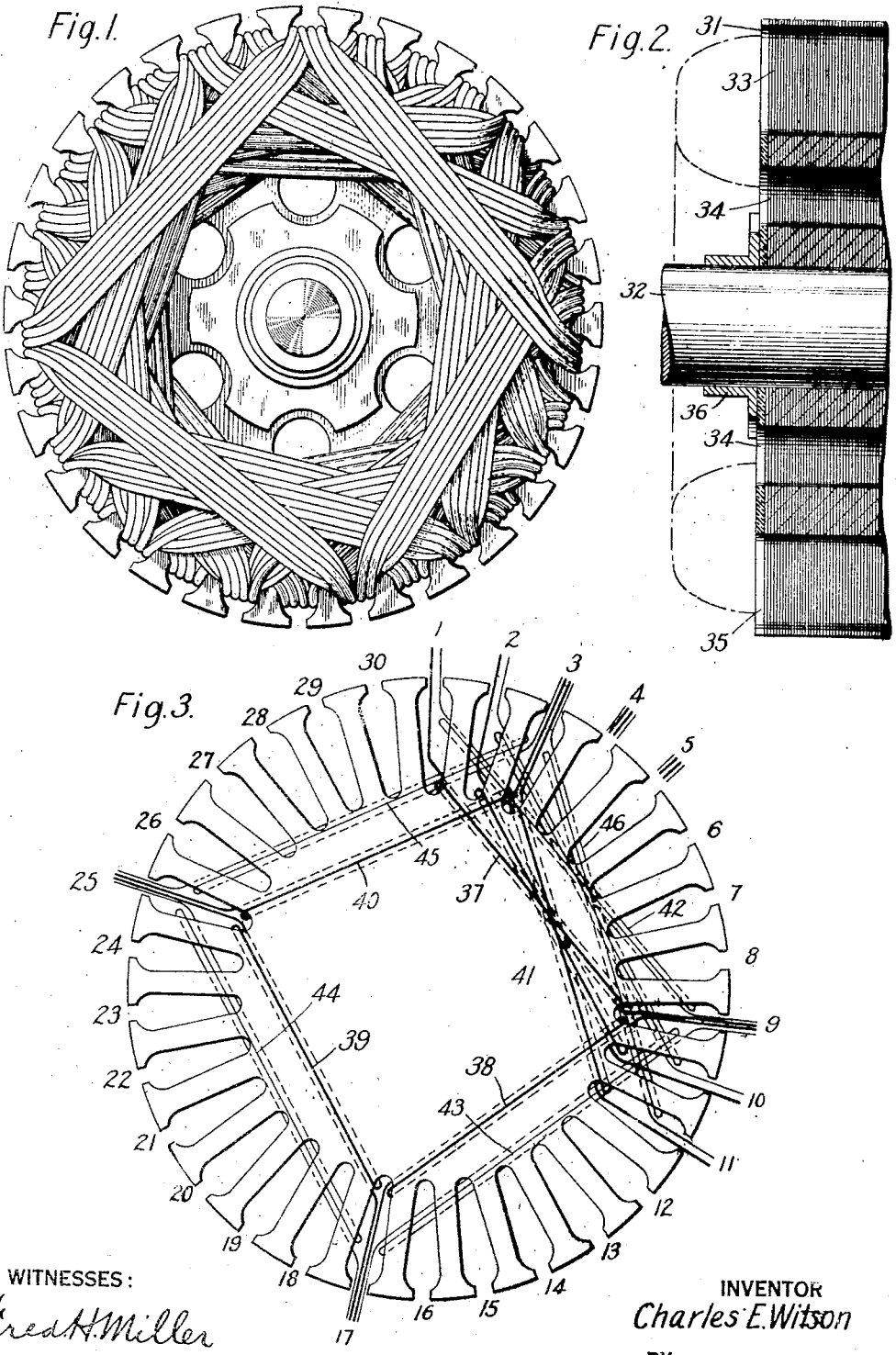

CHARLES E. WILSON, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF WINDING DYNAMO-ELECTRIC-MACHINE ARMATURES.

1,292,551.

Specification of Letters Patent.   Patented Jan. 28, 1919.

Application filed February 17, 1915.   Serial No. 8,867.

*To all whom it may concern:*

Be it known that I, CHARLES E. WILSON, a citizen of the United States, and a resident of Wilkinsburg, in the county of Allegheny and State of Pennsylvania, have invented a new and useful Improvement in Methods of Winding Dynamo-Electric-Machine Armatures, of which the following is a specification.

My invention relates to dynamo-electric machines and particularly to armature windings therefor, and it has for its object to provide a method of winding the armatures of dynamo-electric machines which shall insure a symmetrical distribution of the end portions of the conductors to form neat and compact structures.

My invention relates particularly to windings for armatures of the type commonly known as lathe-wound or machine-wound armatures, as distinguished from armatures embodying form-wound coils. A serious difficulty has been encountered in connection with machine-wound armatures in that the bottom portions of some of the slots were covered by the end portions of the coils connecting other slots before any conductors had been inserted in the former. In addition, the resulting mechanical structure is unduly heavy and the armature is not properly balanced.

According to the present invention, I provide an armature core having a suitable number of slots. Preferably, the number of slots is not a multiple of the number of field-magnet poles. The throw or pitch of the winding is arranged slightly under or slightly over the pole pitch. The conductors are then inserted in the pair of slots to be connected and a sufficient number of turns are made to provide, for example, half the conductors which connect this pair of slots.

One of the pair of slots is then connected, in a similar manner, to its corresponding slot in the proper direction around the armature. The winding progresses in this manner until it closes upon itself. Substantially the lower halves of the connected slots are then occupied by a series of coils formed in the manner just described. If the number of slots and the winding pitch have been so chosen that all of the slots have been partly filled, the process is repeated, a new starting point being chosen for the purpose of securing a symmetrical distribution of the end portions of the coils. If, however, only one half of the slots have been connected when the winding closes upon itself, the remaining slots are partly filled in the same manner. The outer portions of the slots are then filled by a duplication of the process just described. As in the case first described, a new starting point is chosen for the superposed portion of the winding in order to insure an even distribution of the weight.

The details of my invention will be described in connection with the accompanying drawings in which Figure 1 is an end view, in elevation, of an armature wound in accordance with my invention. Fig. 2 is a view, in longitudinal section, of a portion of the armature of Fig. 1. Fig. 3 is a diagrammatic view of a part of the coils forming my improved winding.

Referring particularly to Figs. 1 and 2, the armature 31 of a dynamo-electric machine comprises a shaft 32 upon which are mounted the usual laminæ 33 having ventilating openings 34. The ends of the armature are provided with plates 35 of insulating material and of a shape corresponding to that of the laminæ. The core structure is retained in position on the armature shaft by collar members 36, only one of which is shown.

As shown in Figs. 1 and 3, the armature is provided with thirty slots of the partly-closed type. It will be understood that this number is taken by way of example only and that any other suitable number of slots may be chosen. The armature is adapted for use in connection with a four-pole field-magnet structure and the number of slots is therefore not a multiple of the number of poles. The pitch or throw of the windings is eight slots which exceeds the pole pitch by a small amount.

The armature is mounted upon a lathe or other suitable machine by means of which it may be rotated above the axis of its shaft and also about an axis transverse to the shaft. Starting at the front or commutator end of any desired slot, which may be considered as slot 1, two conductors are simultaneously inserted in the slot and continued across the rear end of the armature and inserted in slot 9. The conductors are then continued across the front end of the armature through slot 1 and again across to slot 9. This process is repeated until three complete turns have been made.

The bottom portions of slots 1 and 9 are then occupied by a coil 37 consisting of six conductors. The terminals of the coil are given such a length that the ends may be attached to the corresponding commutator bars. The respective terminals are identified by any suitable device, as, for example, by sleeves of different colors in order that the proper connections may be made after all the coils are formed.

The coil 37 is illustrated diagrammatically in Fig. 3, only one conductor being shown and the number of turns being limited to two for the sake of clearness. Only a small portion of the coil 37, if any, would be visible in Fig. 1, a view of the remainder being obscured by the coils subsequently formed. However, no attempt will be made to designate particular coils in Fig. 1 by reference numerals as this view is intended to illustrate the general appearance only of the completed end structure.

In the same manner, a coil 38 is formed to connect slots 9 and 17, and coils 39, 40 and 41 respectively connect slots 17 and 25, 25 and 3, and 3 and 11. The process is continued, the winding progressing around the armature in a clockwise direction. Slots 1, 9, 17, 25, 3, 11, 19, 27, 5, 13, 21, 29, 7, 15, 23 and 1 are thus connected in order. It will be noted that, when a series of fifteen coils has been completed, the winding closes upon itself and the slots corresponding to odd numbers have been connected. Approximately, the lower half of each of these slots is occupied by the completed coils, but the end connections do not cover any portion of the unoccupied slots.

Starting with slot 2, coils are then formed in the slots having even numbers in the following order; 2, 10, 18, 26, 4, 12, 20, 28, 6, 14, 22, 30, 8, 16, 24 and 2. As before, the winding closes when a series of fifteen coils have been formed. The two series of coils thus formed constitute what may be termed the first set of coils or one-half the total number forming the complete winding. Each of the slots is now occupied by two coils of six conductors each, the twelve conductors constituting one-half of the total number for each slot. The upper or outer portions of the slots, which remain to be filled, are unobstructed at the ends by the end portions of the coils formed as above described.

The set of outer coils is then formed, beginning with slot 10 and proceeding in a clockwise direction around the armature to connect slots 10, 18, 26, 4, 12, 20, 28, 6, 14, 22, 30, 8, 16, 24, 2 and 10 in the order named. The winding closes when a series of fifteen coils has been formed and the slots having even numbers are filled. Starting with slot 11 and proceeding in the same manner as above described, a series of fifteen coils is next wound in the same manner in the slots having odd numbers.

Each of the slots is now occupied by four coils of six conductors each, making a total of twenty-four conductors. Each of the two sets of coils forming the complete winding consists of two closed series of coils, each series consisting of fifteen coils. Referring particularly to Fig. 3, outer coils 42, 43, 44, 45 and 46, which respectively connect slots 1, 9, 17, 25, 3 and 11 in pairs, are shown by way of example to illustrate the relative distances of the inner and the outer coils from the axis of the armature.

The respective terminals of the outer coils are distinguished from the terminals of the inner coils and from each other by insulating sleeves of suitable colors. The terminals are then connected to the corresponding commutator bars which may be, for example, sixty in number. Two parallel paths through the armature are thus provided.

The resulting end structure is a neat and compact arrangement of the coils to form a ring having approximately the shape of a semi-circle in cross section. The coils are symmetrically disposed about the armature axis and a balanced structure is thereby easily obtained. Because of the short end throw, a small quantity of material is included in the end connections, and the weight of the end structure is relatively small. The winding is of such a design that it may be readily and conveniently inserted. The ventilation of the armature is not affected by the winding because the openings are substantially unobstructed.

While a particular form of winding has been shown and described, it will be understood that the number of armature slots may be varied with a corresponding effect upon the number of coils necessary to be formed in closing the winding. For example, if twenty-seven slots are employed and the winding pitch is seven slots, twenty-seven coils are necessary to close the series. Only one series is necessary, therefore, to partially fill each slot and thereby form one-half of the winding. By starting at a different point in the armature, an additional twenty-seven coils may be inserted in the upper portions of the slots, and a symmetrical distribution of the end connections is thereby insured.

I claim as my invention:

1. The method of winding armatures of dynamo-electric machines which consists in forming a coil in the bottoms of two slots, forming a second coil in one of said slots and the bottom of a third slot and proceeding in a similar manner progressively around the armature until each of the slots is occupied by the conductors of two coils.

2. The method of winding armatures of dynamo-electric machines which consists in forming a coil having a pitch of which the number of slots is not a multiple for connecting the bottoms of two slots, forming a second and similar coil for connecting one of said two slots and a third slot and forming coils similarly related progressively around said armature until the first of said two slots is occupied by a second coil.

3. The method of winding armatures for dynamo-electric machines which consists in forming a coil having a pitch of which the number of slots is not a multiple, in the bottom of two slots, forming a similar coil for connecting one of said slots with the bottom of a third slot and proceeding progressively around the armature in a similar manner until all of the slots are occupied by the same number of coils.

4. The method of winding an armature of dynamo-electric machine which consists in forming a set of coils to occupy the inner portions of the slots and arranged to form at least one closed series of coils, each of said coils, except the first and last of the series, connecting slots occupied respectively by the preceding and the succeeding coil to be formed, and then forming a second and similar set of coils to occupy the outer portions of said slots.

5. The method of winding an armature of a dynamo-electric machine which consists in forming a set of coils in order around the circumference of the armature to form a closed series, each of said coils, except the first and the last of the series, connecting slots occupied respectively by the preceding and the succeeding coil to be formed, and then, from a different starting point, forming a second set of coils in order to constitute a second closed series of coils superposed upon the other set of coils.

6. The method of winding an armature of a dynamo-electric machine which consists in constructing a set of coils in order around the circumference of the armature to form a plurality of closed series of coils, each of said coils, except the first and the last of the series, connecting slots occupied respectively by the preceding and the succeeding coil to be formed, and then starting at another point in said circumference, constructing a second set of coils to form a plurality of closed series of coils that are superposed upon the other set of coils.

7. The method of winding armatures for dynamo-electric machines which consists in forming a closed series of coils of uniform pitch progressively around the armature, each of said coils, except the first and last in the series, occupying slots respectively occupied by the preceding and the succeeding coil to be formed.

8. The method of winding armatures for dynamo-electric machines that comprises winding a set of coils of uniform pitch progressively around a slotted armature core in such a manner that the slot conductors of said coils shall be disposed only in the bottom portions of the slots and the end connections of said slot conductors shall be arranged so as not to cover unoccupied portions of the slots, each of said coils, except the first and last in the series, occupying slots respectively occupied by the preceding and the succeeding coil to be wound.

In testimony whereof, I have hereunto subscribed my name this 13th day of Feb., 1915.

CHARLES E. WILSON.

Witnesses:
G. J. SCHMIDT,
B. B. HINES.